UNITED STATES PATENT OFFICE.

JEREMIAH W. BRADLEY, OF MARSHALL, NORTH CAROLINA.

EXPECTORANT.

SPECIFICATION forming part of Letters Patent No. 402,296, dated April 30, 1889.

Application filed February 13, 1889. Serial No. 299,751. (No specimens.)

*To all whom it may concern:*

Be it known that I, JEREMIAH W. BRADLEY, a citizen of the United States, residing at Marshall, in the county of Madison and State of North Carolina, have invented a new and useful composition of matter to be used for the relief of the lungs and their restoration to their natural functions, of which the following is a specification.

My composition consists of the following ingredients, combined in the proportions stated, viz: pure water, five gallons; life-everlasting, (*Gnaphalium margaritaceum*,) two and three-fourths pounds; ground-ivy, (*Glechoma hederacea*,) one and one-fourth pound; sal-soda, two ounces; paregoric, eight ounces; sirup of squills, eight ounces; cinnamon, three ounces; sugar, (white brown,) two and one-half pounds. These ingredients are to be compounded and thoroughly mixed in the following manner: Boil the two and three-fourths pounds of *Gnaphalium margaritaceum* (life-everlasting) and one and one-fourth pound of *Glechoma hederacea* (ground-ivy) in the five gallons of pure water for four or five hours; then strain the same; then add two ounces of sal-soda and boil for five minutes; then add two and one-half pounds of sugar, (white brown,) and then it is ready for the eight ounces of paregoric, eight ounces sirup of squills, and three ounces of cinnamon, which, being added, will make one gallon of the composition ready for use.

In using the said composition for diseases of the lungs it should be taken three times a day—morning, noon, and night—after meals, except in the morning, and then the first thing on rising. Dose, one tea-spoonful.

By the use of the above composition the lungs are relieved of all heaviness and their natural functions fully restored.

I am not aware that all of the ingredients of my composition, in the proportions stated, have been used together.

What I claim, and desire to secure by Letters Patent of the United States, is—

The herein-described composition of matter to be used in lung diseases, consisting of water, life-everlasting, (*Gnaphalium margaritaceum*,) ground-ivy, (*Glechoma hederacea*,) sal-soda, paregoric, sirup of squills, cinnamon, and sugar, in the proportions specified.

JEREMIAH W. BRADLEY.

Witnesses:
F. T. WALSER,
W. J. MCINTOSH.